United States Patent [19]

Leistner et al.

[11] Patent Number: 5,665,820
[45] Date of Patent: Sep. 9, 1997

[54] MODIFIED ELASTOMERIC POLYPROPYLENES

[75] Inventors: Dirk Leistner, Linz; Manfred Rätzsch, Kirchschlag, both of Austria; Achim Hesse, Dresden, Germany; Norbert Hafner, Linz, Austria; Markus Gahleitner, Neuhofen, Austria; Klaus Bernreitner, Linz, Austria

[73] Assignee: PCD Polymere Gesellschaft m.b.H., Linz, Austria

[21] Appl. No.: 541,093

[22] Filed: Oct. 11, 1995

Related U.S. Application Data

[62] Division of Ser. No. 277,310, Jul. 22, 1994, abandoned.

[30] Foreign Application Priority Data

Jul. 26, 1993 [AT] Austria ................ 1484/93

[51] Int. Cl.⁶ ................................ C08L 51/06
[52] U.S. Cl. ................ 525/66; 525/63; 525/64; 525/67; 525/68; 525/69; 525/71; 525/74; 525/78
[58] Field of Search ............. 525/71, 74, 78, 525/66, 64, 69, 63, 67, 68

[56] References Cited

U.S. PATENT DOCUMENTS

| | | | |
|---|---|---|---|
| 3,177,269 | 4/1965 | Nowak et al. | 525/263 |
| 3,177,270 | 4/1965 | Jones et al. | 525/263 |
| 3,868,433 | 2/1975 | Bartz et al. | 156/327 |
| 4,260,690 | 4/1981 | Binsack et al. | 525/64 |
| 4,335,225 | 6/1982 | Collette et al. | 525/240 |
| 4,522,982 | 6/1985 | Ewen | 525/240 |
| 4,746,704 | 5/1988 | Bergström et al. | 525/301 |
| 5,047,462 | 9/1991 | Kehr et al. | 524/423 |
| 5,118,768 | 6/1992 | Job et al. | 526/124 |
| 5,248,719 | 9/1993 | Kehr et al. | 524/423 |

FOREIGN PATENT DOCUMENTS

| | | |
|---|---|---|
| 0261748 | 3/1988 | European Pat. Off. . |
| 0280454 | 8/1988 | European Pat. Off. . |
| 0309674A2 | 4/1989 | European Pat. Off. . |
| 0317358 | 5/1989 | European Pat. Off. . |
| 0426482A2 | 5/1991 | European Pat. Off. . |
| 0450982A2 | 10/1991 | European Pat. Off. . |
| 0463497A1 | 1/1992 | European Pat. Off. . |
| 0536753A1 | 4/1993 | European Pat. Off. . |
| 4203542A1 | 8/1993 | Germany . |
| 05039385A | 2/1993 | Japan . |
| 578009 | 10/1977 | U.S.S.R. . |
| 413736 | 2/1979 | U.S.S.R. . |
| 1020253A | 5/1983 | U.S.S.R. . |
| WO91/05008 | 4/1991 | WIPO . |
| WO93/06175 | 4/1993 | WIPO . |

Primary Examiner—Mark L. Warzel
Attorney, Agent, or Firm—Wenderoth, Lind & Ponack

[57] ABSTRACT

Elastomeric polypropylenes modified by grafting and blends thereof with isotactic polypropylenes modified by grafting, and the use thereof as compatibilizers or adhesion promoters for blends and metal composites.

3 Claims, No Drawings

MODIFIED ELASTOMERIC POLYPROPYLENES

This is a divisional application of Ser. No. 08/277,310, filed Jul. 22, 1994, now abandoned.

The invention relates to elastomeric polypropylenes modified by grafting, their blends with isotactic polypropylenes modified by grafting, and the use thereof as compatibilizers or adhesion promoters.

It is disclosed, for example in EP-A-280,454, EP-A-317,358, WO 91/5008, U.S. Pat. No. 3,868,433, U.S. Pat. No. 4,260,690 and WO 93/6175 that isotactic polypropylenes (IPP) can be chemically modified with graft monomers, such as, for example, styrene, maleic anhydride (MAA), acrylic acid and derivatives thereof. These grafting reactions give graft copolymers of PP which generally have higher polarity than the starting PP. These products are used, for example, as adhesion promoters in metal coating with polyolefins, such as polyethylene, PP and PP copolymers, or as compatibilizers in blends of polyolefins and polymers which are immiscible with polyolefins, such as, for example, polyamides, polyesters, polycarbonates, polystyrene, polyacrylates and polyurethanes. In both fields of use, the adhesion promoters or compatibilizers are present in the intermediate layer between the polyolefin and the metal or blend component and bring about adhesion between the materials by means of chemical and/or physical coupling (for example cocrystallization). In the case of PP blends with other thermoplastics, for example polyamide 6 (PA6), the mechanical properties, such as impact strength, strength and rigidity (modulus of elasticity), are decisively determined by the structure of the boundary layer between the phases. For example, a PP/PA6 blend which contains a compatibilizer based on an MAA-grafted styrene-ethylene/butylene-styrene three-block copolymer (SEBS) has relatively great toughness (impact strength, falling dart test). Similar behavior is shown by blends of PP and PA6 with the use of an MAA-grafted ethylene/propylene rubber (EPR) as compatibilizer. However, the compatibilizers mentioned, for example those of the SEBS type, have the disadvantage of a complicated and expensive synthesis, since the copolymerization is carried out in solution and subsequent grafting with functional monomers is necessary.

Grafted ethylene/propylene rubber has the disadvantage of poor flow, since the grafting is accompanied by partial crosslinking of the ethylene component in the EPR. The same applies to grafted EPDM.

Compatibilizers or adhesion promoters based on grafted isotactic polypropylenes have in particular the disadvantage that, in many fields of use for thermoplastics, such as, for example, vehicle and apparatus construction, the mechanical properties of the blends used, in particular the toughness, are not sufficiently high.

It was therefore the object to find substances which act as compatibilizers- or adhesion promoters for polyolefins and which, particularly in blends of polyolefins with nonolefinic thermoplastics, result in improved mechanical properties, in particular increased toughness and lower brittleness.

The object is achieved, according to the invention, if graft copolymers of elastomeric PP (ELPP) or mixtures thereof with graft polymers of isotactic polypropylene (IPP) are used as adhesion promoters or compatibilizers.

The invention accordingly relates to elastomeric polypropylenes (ELPP), modified with ethylenically unsaturated graft monomers, and blends thereof with isotactic polypropylenes (IPP) modified with ethylenically unsaturated graft monomers.

The elastomeric polypropylenes used for the grafting reactions are in particular those described in U.S. Pat. No. 4,335,225, U.S. Pat. No. 4,522,982 and U.S. Pat. No. 5,118,768. These are to be understood as meaning both homopolymers and copolymers. They have essentially a stereoregular block arrangement in the chain structure and consist, for example, of blocks of isotactic and atactic propylene sequences which are arranged alternately in the polymer chain. The incorporation of additional comonomers in the polymer chain is also possible. In addition to propylene units, the copolymers may also contain other olefin units, such as, for example; ethylene, butene, pentens or hexene units, in the molecule. They are prepared, for example according to U.S. Pat. No. 4,335,225, by polymerization with special catalysts which are obtained by reaction or mixing of organic Ti, Zr or Hf compounds with a metal oxide, such as, for example, $Al_2O_3$, $TiO_2$, $SiO_2$ or MgO. Furthermore, the elastomeric polypropylenes used for the degradation may also be prepared, for example, analogously to U.S. Pat. No. 4,522,982 with the aid of metallocene catalysts in combination with alumoxanes, or analogously to U.S. Pat. No. 5,118,768 using catalysts based on magnesium alkoxides and tetravalent titanium chloride in the presence of special electron donors.

According to the invention, the elastomeric polypropylenes (ELPP) may be grafted alone or as a mixture with other, in particular isotactic, polypropylenes (IPP). All known polypropylene homopolymers or copolymers with other olefins may be used as the other polypropylenes. However, it is also possible to graft ELPP and IPP separately in each case and to mix the polypropylenes modified in this manner. The blends preferably consist of elastomeric polypropylenes with a content of 0 to 80% by weight, particularly preferably 0.5 to 50% by weight, of other, in particular isotactic, polypropylenes.

The polypropylenes grafted according to the invention are polypropylenes which have, along the polymer chain, one or more chemically bonded (grafted-on) functional groups and/or polymeric chains of monomer building blocks with or without functional groups. For this purpose, ELPP or IPP can be grafted with unsaturated mono- and/or dicarboxylic acids, their anhydrides, their esters with aliphatic alcohols and dialcohols having one to 10 C atoms and glycidyl ethers, esters of vinyl alcohol, and vinyl aromatics or mixtures of these monomers, and mixtures of these monomers and olefins having 2 to 10 C atoms.

Graft monomers selected from the group consisting of the ethylenically unsaturated aliphatic or aromatic carboxylic acids or derivatives thereof, from the group consisting of maleic acid, acrylic acid or methacrylic acid or derivatives thereof, and from the group consisting of the vinyl aromatics are particularly preferred. For example, esters, anhydrides, acyl halides, amides, imides or oxazolines are to be understood as possible derivatives.

Thus, for example, ELPP, IPP or blends of ELPP and IPP can be reacted in solution or in the melt, by means of free radical graft copolymerization, with acrylic acid or its derivatives, such as methyl methacrylate, butyl acrylate, tert-butyl acrylate, glycidyl acrylate, glycidyl methacrylate or 2-hydroxyethyl acrylate, or with maleic acid or its derivatives, such as maleic anhydride (MAA), or mono- and diesters of maleic acid with methanol, ethanol, butanol and hexanol to give acid-, anhydride-, ester-, hydroxyester- and glycidyl ether-modified ELPP or IPP. The preparation of graft copolymers of ELPP and IPP and derivatives of vinyl alcohol, preferably esters with aliphatic carboxylic acids, e.g. vinyl acetate, is also possible. A further group comprises the graft products with vinyl aromatics, e.g. styrene. It is also possible to react ELPP or IPP with mixtures of graft monomers of any composition, such as, for example, mixtures of different acrylic acid derivatives, mixtures of acrylic acid derivatives and maleic acid derivatives, mixtures of acrylic acid derivatives and vinyl alcohol derivatives, mixtures of, on the one hand, acrylic acid derivatives and/or maleic acid derivatives and/or vinyl alcohol derivatives and, on the other hand, vinyl aromatics, such as, for example, styrene, and/or alpha-olefins having 2 to 10 C atoms, to give ELPP graft copolymers or mixtures of ELPP/IPP graft copolymers.

The degree of grafting, that is to say the content of graft monomers in the grafted polypropylenes, is advantageously about 0.1 to 30% by weight, preferably 0.5 to 10% by weight and particularly preferably 0.5 to 5% by weight.

The ELPP or ELPP/IPP graft copolymers according to the invention can be prepared by free radical graft copolymerization methods, as described, for example for IPP, in EP-A-280,454, EP-A-317,358, WO 91/5008, U.S. Pat. No. 3,868,433, U.S. Pat. No. 4,260,690 and DE-A-41 31 908, by grafting ELPP or blends of ELPP and IPP with ethylenically unsaturated graft polymers. The grafting reaction is carried out, for example, in solution, preferably in aromatic hydrocarbons, in the temperature range from 50° to 200° C., preferably between 80° and 150° C., or in the melt, preferably in extruders, in the temperature range from 170° to 300° C., preferably between 200° and 250° C. It is advantageous to initiate free radical production in the polymer by free radical initiators, such as, for example, peroxides or azo compounds, and/or by high-energy radiation, such as gamma or electron radiation.

The invention also relates to the use of ELPP modified according to the invention or blends thereof with modified IPP as compatibilizers or adhesion promoters for polyolefins, in particular in blends of polyolefins with non-olefinic thermoplastics, or as adhesion promoters in polyolefin/metal composites. The ELPP or ELPP/IPP graft copolymers according to the invention can be used as compatibilizers in particular in blends of, on the one hand, polyethylene, IPP or its copolymers with ethylene and other alpha-olefins and, on the other hand, nonolefinic thermoplastics, for example from the group consisting of polyamides, polyesters, polycarbonates, polystyrenes, polyacrylates and polyurethanes.

The invention furthermore relates to blends of polyolefins and nonolefinic thermoplastics, which contain the ELPP and/or ELPP/IPP graft copolymers according to the invention as compatibilizers. The blends according to the invention have better mechanical properties, for example higher toughness values (double-V impact strength, falling dart test) and lower rigidity values than blends of the same composition with grafted IPP as compatibilizers. The blends according to the invention may furthermore contain customary additives, such as, for example, processing and long-term stabilizers, nucleating agents, reinforcing materials and fillers, such as, for example, talc, chalk or kaolin. Thus, for example, advantages are obtained if the blends according to the invention contain 2 to 50% by weight, preferably 10 to 40% by weight, of talc or 1 to 40% by weight of reinforcing fibers, for example glass fibers or carbon fibers.

The blends according to the invention contain about 0.1 to 30% by weight of the compatibilizers according to the invention. Preferably 1 to 15% by weight, particularly preferably 2 to 10% by weight, of compatibilizers are used. The mixing ratio of polyolefins to nonolefinic thermoplastics extends over the total possible mixing range and is about 5 to 95% by weight, preferably 30 to 80% by weight, of polyolefin and 5 to 95% by weight, preferably 20 to 70% by weight, of nonolefinic thermoplastic. The blends are used, for example, in the extrusion or injection molding of films or shaped articles.

Particularly advantageous combinations of compatibilizers according to the invention for special blends are listed below by way of example:

a) MAA-grafted ELPP, MAA-co-styrene-grafted ELPP and acrylic acid-grafted ELPP for blends of IPP and its copolymers with polyamides, for example PA 6, PA 6,6 and copolymers thereof with aromatic building blocks, such as, for example, phthalic acid, terephthalic acid, isophthalic acid, p-, o- and m-phenylenediamine, aromatic aminocarboxylic acids, such as, for example, p-, o- and m-aminobenzoic acid, and further aromatic dicarboxylic acids, diamines and aminocarboxylic acids having more than one aromatic ring, b) MAA-grafted ELPP for blends of IPP and its copolymers with polyesters, for example polyalkylene terephthalates, such as, for example, polyethylene terephthalate (PET) or polybutylene terephthalate (PBT), and copolymers thereof with additional comonomers, such as, for example, p-hydroxybenzoic acid, isophthalic acid and/or additional aliphatic diols and diphenols, as well as blends with wholly aromatic polyesters, c) MAA-grafted ELPP for blends of IPP and its copolymers with thermoplastic polyurethanes, d) glycidyl methacrylate- and glycidyl acrylate-grafted ELPP for blends of IPP and its copolymers with polyesters, for example polyalkylene terephthalates (PET, PBT) and copolymers thereof with additional comonomers as stated under b, as well as blends with wholly aromatic polyesters, e) further ELPP graft copolymers with acrylic acid derivatives, such as, for example, methyl methacrylate, butyl acrylate, hydroxyesters of acrylic acid, acrylic acid, oxazoline derivatives of acrylic and methacrylic acid, for blends of IPP and its copolymers with polyesters, for example polyalkylene terephthalates (PET, PBT) and copolymers thereof with additional comonomers as stated under b, as well as blends with wholly aromatic polyesters, f) vinyl acetate-grafted ELPP for blends of IPP and its copolymers with polyesters, for example polyalkylene terephthalates (PET, PBT) and copolymers thereof with additional comonomers as stated under b, as well as blends with wholly aromatic polyesters, g) glycidyl methacrylate and glycidyl acrylate-grafted ELPP for blends of IPP and its copolymers with polycarbonates, h) styrene-grafted ELPP for blends of IPP and its copolymers with polystyrene and its copolymers, i) styrene-grafted ELPP for blends of IPP and its copolymers with polycarbonates and its copolymers, j) glycidyl methacrylate- and glycidyl acrylate-grafted ELPP and further ELPP graft copolymers with acrylic acid derivatives, such as, for example, methyl methacrylate, butyl acrylate, hydroxyesters of acrylic acid or acrylic acid, for blends of IPP and its copolymers with polyacrylates and polymethyl methacrylates, k) a mixture of 50 to 99.5% by weight of MAA-grafted ELPP and 0.5 to 50% by weight of grafted IPP for blends of IPP and its copolymers with polyamides.

I. Preparation of the elastomeric polypropylenes

Example A:

a) Preparation of the catalyst 44.22 g of grayish brown tetraneophylzirconium (TNZ; Tm=66° C., Du Pont) were dissolved, under a very pure nitrogen atmosphere, in 620 ml of n-hexane, purified by means of a Cu catalyst (BASF catalyst R 3–11 at 70° C.) for removal of oxygen and a 4 or 10A molecular sieve for removal of water and polar impurities, at 20° C. in a flask flushed with inert gas. 15 min after the major part of the insoluble residue had settled out, the suspension obtained was filtered through a glass frit into a stirred glass flask cooled to −40° C. and flushed with inert gas (heated at above 150° C. and flushed with very pure nitrogen (less than 2 ppm of $O_2$)). After the end of the filtration (duration about 140 min), the flask was kept at −40° C. for a further 15 min while stirring, in order to precipitate the TNZ as quantitatively as possible. After the TNZ had settled out, the supernatant solution was filtered by means of a cartridge filter under superatmospheric $N_2$ pressure into a further cooled flask flushed with inert gas. The remaining TNZ was dissolved in a further 350 ml of n-hexane at about 5°–10° C. in the course of 15 min and, after cooling to −34° C., precipitated again.

After the TNZ precipitate had settled out, the solution was again filtered by means of superatmospheric $N_2$ pressure through a glass cartridge filter into the cooled flask flushed with inert gas and containing the first mother liquor. The TNZ was then dried by applying an oil pump vacuum (less than $1.10^{-2}$ mbar) via intermediate cold traps cooled with liquid nitrogen. The purified TNZ had a melting point of 68° C. and was white to cream-colored. The collected mother liquors were evaporated down to about 200 ml, and the still dissolved TNZ was precipitated by cooling to −40° C. After further pressure filtration through a cartridge filter, the TNZ was again dissolved in 100 ml of hexane, again precipitated at −40° C., filtered off and dried as above by means of a vacuum. The total yield of this purification process was 82.2%. All operations were carried out under very pure nitrogen.

266.7 g of conditioned $Al_2O_3$ (Alumina C from DEGUSSA, conditioned at about 800°–1000° C. in an $N_2$ stream and after storage at a relative humidity of 50% and 23° C. for 16 hours and further drying to obtain an optimism hydroxyl concentration of the surface of about 1 mmol/g of Alumina C at 400° C. in a nitrogen stream) were weighed into a 6 l four-necked flask flushed with inert gas, and 5035 ml of n-hexane, purified by means of BASF catalyst R 3–11 and a 4 or 10A molecular sieve, were added. The suspension was stirred for about 1 hour at 300 rpm. The 33.23 g of TNZ prepared above (without product from worked-up mother liquor) were then dissolved in 465 ml of n-hexane (purified as above) at 20° C., and this TNZ solution was added dropwise as soon as possible, with continued stirring, to the $Al_2O_3$ suspension in the course of 50 min, a substantial reduction in the viscosity of the suspension occurring after the addition of a few ml of TNZ solution. After the addition of the TNZ solution, the speed was reduced to about 120 rpm and stirring was continued for a further 12.5 hours in the absence of light. To accelerate the filtration, the catalyst solid obtained was allowed to stand for 1 hour and the solution was finally separated off by means of pressure filtration through a glass frit (duration 3 hours). The catalyst solid was then dried by applying a vacuum of less than $1.10^{-2}$ mbar (oil diffusion pump with two intermediate cold traps cooled with liquid nitrogen) while stirring until the weight remained constant at 292 g (duration about 5 hours). All operations were carried out under very pure nitrogen.

The TNZ/$Al_2O_3$ catalyst obtained had a beige to pale brown color and was a free-flowing powder which had a tendency to form small spheres of about 1 mm diameter. The Zr content was 1.66% by weight.

b) Polymerization:

A 20 l double-jacket reactor thoroughly heated at 160° C. and 0.1 mbar and having a surface-polished stirrer passing close to the wall, a thermostat jacket and temperature, speed and torque measuring means was filled with 7.3 kg of propens at 25° C. after three propens/vacuum flushing cycles. After the stirrer had been run up to 400 rpm, 10.02 g of the catalyst prepared according to a) were flushed in with 300 ml of liquid propens (about 20° C.) and the speed was reduced to 260 rpm after 2 min. Thereafter, the propens temperature was increased to 60° C. in the course of about 10 min and this temperature was maintained for 120 min from the addition of the catalyst onwards. The stirrer speed was then reduced to 200 rpm and 1880 g of acetone preheated to about 50° C. were introduced into the reactor by means of superatmospheric nitrogen pressure in the course of 3 min. After the stirrer speed had been increased to 400 rpm for about 2 min and then reduced to 100 rpm, the unconsumed propene was flashed off at 60° to 46° C. in the course of 20 min. The reining ELPP (elastomeric polypropylene)/acetone slurry was stirrable and could be discharged via the 1 inch base outlet of the reactor.

After filtration of the ELPP and drying in a stream of nitrogen at 50° C., 1.88 kg of a pulverulent, crumbly, nontacky ELPP having a melting point (Tm) of 148.1° C. (measured using a Du Pont differential scanning calorimeter 910/20 (Thermal Analyst 2100)), corresponding to a balanced Zr content of 89 ppm and an $Al_2O_3$ content of 0.49% by weight, were obtained. The ELPP had an MFI (melt flow index) according to ISO 1133/DIN 53735, at 230° C./2.16 kg, of less than 0.01 g/10 min.

Example B:

After cooling to below 0° C., the resilient polypropylene obtained according to Example A was milled in a breaker mill to a particle size of less than 3 mm. Thereafter, 0.2% by weight, based on the amount of polypropylene, of bis(2-(1,1-dimethylethyl)peroxyisopropyl)benzene (Perkadox 14SFI, from Akzo) was mixed in, and the mixture was melted at 190° C. in an 18 mm Brabender single-screw extruder and was extruded at an output rate of 1 kg/h via a circular die to give an extrudate of 3 mm diameter. The residence time in the extruder was about 1 minute. After solidification, the extrudate was granulated in a water bath. The elastomeric polypropylene was degraded to an MFI of 25 g/10 min. The MFI was measured according to ISO 1133/DIN 53735 at 230° C./2.16 kg.

II. Preparation of the compatibilizers:

Example 1:

In a 2 l stirred vessel heated by means of an oil bath and provided with a reflux condenser, nitrogen inlet, gas-tight stirrer and dropping funnel, 50 g of elastomeric PP according to Example A (MFI: less than 0.01) were dissolved in 1250 ml of xylene (isomer mixture) under a stream of nitrogen and with stirring at 120° C., and 60 g of maleic anhydride (MAA) were then added. 40 g of benzoyl peroxide, dissolved in 100 ml of xylene, were added dropwise to the solution at 130° C. in the course of 60 min. The solution was stirred for a further 60 min and, after cooling to 80° C., was added to 2.5 l of acetone. The precipitated graft copolymer was filtered off with suction, washed in 2.5 l of acetone, filtered off with suction again and dried at 80° C. for 8 hours in vacuo.

The degree of MAA grafting determined by IR spectroscopy was 1.2% by weight, based on the total amount.

Comparative Example V1:

A compatibilizer was prepared analogously to Example 1, but, instead of ELPP, 100 g of isotactic PP (IPP, Daplen B powder, reactor product, PCD polymer, MFI: less than 0.01) in 1250 ml of xylene were reacted with 60 g of MAA and 40 g of benzoyl peroxide. The degree of MAA grafting determined by IR spectroscopy was 1.3% by weight, based on the total amount.

Example 2:

100 g of an elastomeric polypropylene (ELPP) according to Example B and having an MFI of 25, dissolved in 650 ml of xylene, were reacted with 40 g of MAA and 20 g of benzoyl peroxide, analogously to the procedure described under Example 1. The degree of MAA grafting was 2.9% by weight, based on the total amount.

Comparative Example V2:

100 g of an isotactic polypropylene (Daplen RT 551, PCD polymers) having an MFI of 28, dissolved in 650 ml of xylene, were reacted with 60 g of MAA and 40 g of benzoyl peroxide, analogously to Example 1. The degree of MAA grafting was 2.7% by weight, based on the total amount.

Example 3:

100 g of an elastomeric polypropylene according to Example B and having an MFI of 25, dissolved in 650 ml of xylene, were reacted with 40 g of glycidyl methacrylate (GMA, from Fluka Chemic) and 20 g of benzoyl peroxide, analogously to the procedure described under Example 1. The degree of GMA grafting determined by IR spectroscopy was 1.9% by weight, based on the total amount.

Comparative Example V3:

100 g of isotactic pp (IPP, Daplen RT 551, PCD polymers, MFI: 28) in 750 ml of xylene were reacted with 40 g of GMA and 20 g of benzoyl peroxide, analogously to the procedure described in Example 1. The degree of GMA grafting determined by IR spectroscopy was 2.0% by weight, based on the total amount.

Example 4:

100 g of am elastomeric polypropylene according to Example B and having an MFI of 25, dissolved in 650 ml of xylene, were reacted with 40 g of styrene and 20 g of benzoyl peroxide, analogously to the procedure described under Example 1. The gravimetrically determined degree of styrene grafting was 10.4% by weight, based on the total amount.

Comparative Example V4:

100 g of an isotactic polypropylene (Daplen RT 551, PCD polymers) having an MFI of 28, dissolved in 650 ml of xylene, were reacted with 50 g of styrene and 20 g of benzoyl peroxide, analogously to the procedure described under Example 1. The gravimetrically determined degree of styrene grafting was 9.8% by weight, based on the total amount.

III. Preparation of the blends:

Example 5:

Polypropylene/polyamide 6 blend with the use of the ELPP graft copolymer according to Example 1 as a compatibilizer (CO), blend composition IPP/PA6/CO =60/35/5% by weight. A mixture of 3000 g of IPP (Daplen BE 50, PCD polymers, MFI: 0.3), 1750 g of polyamide 6 (SH3, from Leuna Werke AG, viscosity number according to DIN 53727:140 cm$^3$/g in 96% strength sulfuric acid) and 250 g of ELPP graft copolymer according to Example 1 was extruded at a melt temperature of 255° C. in a Berstorff. ZE 25 twin-screw extruder (L/D =49.5) at a throughput of 5 kg/h, quenched in a water bath and granulated. After drying in vacuo at 80° C. (8 hours), the blend granules were injection molded at a melt temperature of 260° C. and a mold temperature of 40° C. to give 150×80×2 mm sheets. The test specimens cut from these sheets were then conditioned for 10 days at 70° C. and 60% relative humidity. The following mechanical tests were carried out:

Determination of the flexural modulus of elasticity according to DIN 53 457 (1987) using 50×10×2 mm test specimens at 23° C.; determination of the double-V flexural impact strength according to DIN 53 753 (1981) using 50×6×2 mm test specimens at 23° C.; determination of the damaging energy (Wmax) and total penetration energy (Wtot) in the penetration test according to DIN 53 443/Part 2 (1984) using 150×80×2 mm sheets at 23° C. The mechanical properties are listed in Table 1.

Comparative Example V5:

With conditions and mixing ratios analogous to those mentioned in Example 5, an IPP/PA 6 blend was prepared using the MAA-grafted IPP not according to the invention and described in Comparative Example V1: 3000 g of IPP (60% by weight), 1750 g of PA 6 (35% by weight) and 250 g of MAA-grafted IPP (according to Comparative Example Vl; 5% by weight). The mechanical properties determined are shown in Table 1.

Example 6:

Under conditions analogous to those mentioned in Example 5, an IPP/PA 6 blend having a mixing ratio (IPP/PA 6/CO) of 75/20/5% by weight was prepared using the MAA-grafted ELPP described in Example 1 as a compatibilizer: 3750 g (75% by weight) of IPP, 1000 g (20% by weight) of polyamide 6 and 250 g (5% by weight) of ELPP graft copolymer according to Example 1.

The mechanical properties of the blend are shown in Table 1.

Comparative Example V6:

Under conditions analogous to those mentioned in Example 6, an IPP/PA 6 blend having a mixing ratio (IPP/PA 6/CO) of 75/20/5% by weight was prepared using the MAA-grafted IPP described in Comparative Example Vl as a compatibilizer: 3750 g (75% by weight) of IPP, 1000 g (20% by weight) of polyamide 6 and 250 g (5% by weight) of IPP graft copolymer from Comparative Example V1.

The mechanical properties of the blend are shown in Table 1.

Example 7:

IPP/Polyamide 6 blend with the use of the ELPP graft copolymer from Example 2 as a compatibilizer, blend composition (IPP/PA6/CO) 45/50/5.

A mixture of 18 g (45% by weight) of IPP (Daplen BE 50, PCD polymers, MFI: 0.3), 20 g (50% by weight) of polyamide 6 (SH3, from Leuna-Werke, viscosity number according to DIN 53727: 150 cm$^3$/g in 96% strength sulfuric acid) and 2 g (5% by weight) of ELPP graft copolymer from Example 2 was introduced, at a chamber temperature of 260° C. and with running headers (60 rpm), into a Brabender Plasticorder having an electrically heatable 50 ml kneading chamber and was headed for five minutes and then removed from the heading chamber. The blend was processed at 260° C. to give a 200×80×2 mm pressed sheet, from which 50×10×2 mm test bars were cut, for the determination of the flexural modulus of elasticity. The flexural modulus of elasticity is shown in Table 1.

Comparative Example V7:

Under conditions analogous to those mentioned in Example 7, an IPP/polyamide 6 blend was prepared with the use of the IPP graft copolymer from Comparative Example V2 as a compatibilizer. Blend composition (IPP/PA 6/CO) 45/50/5: 18 g (45% by weight) of IPP (MFI: 0.3), 20 g (50% by weight) of polyamide 6 and 2 g (5% by weight) of IPP graft copolymer from Comparative Example V2.

The flexural modulus of elasticity is shown in Table 1.

Example 8:

IPP/polyethylene terephthalate blend (PET) with the use of the ELPP graft copolymer from Example 3 as a compatibilizer.

A blend of 18 g (45% by weight) of IPP, 20 g (50% by weight) of PET (Polyclear F, from Hoechst, MW: 60,000) and 2 g (5% by weight) of ELPP graft copolymer from Example 3 was prepared analogously to Example 7.

The flexural modulus of elasticity is shown in Table 1.

Comparative Example V8:

Under conditions analogous to those in Example 8, an IPP/polyethylene terephthalate blend was prepared with the use of the IPP graft copolymer from Comparative Example V3 as a compatibilizer.

Blend composition (IPP/PET/CO) 45/50/5: 18 g (45% by weight) of IPP (MFI: 0.3), 20 g (50% by weight) of PET and 2 g (5% by weight) of IPP graft copolymer from Comparative Example V3.

The flexural modulus of elasticity is shown in Table 1.

Example 9:

Preparation of an IPP/polycarbonate blend (PC) with the use of the ELPP graft copolymer from Example 3 as a compatibilizer.

A blend of 18 g (45% by weight) of IPP, 20 g (50% by weight) of PC (Lexan PK 1340, from General Electric, MVR (melt volume flow rate according to ISO 1133, 300° C./1.2 kg): 6 ml/10min) and 2 g (5% by weight) of ELPP graft copolymer from Example 3 was prepared analogously to Example 7. The flexural modulus of elasticity is shown in Table 1.

Comparative Example V9:

Under conditions analogous to those mentioned in Example 9, an IPP/polycarbonate blend was prepared with the use of the IPP graft copolymer from Comparative Example V3 as a compatibilizer. Blend composition (IPP/PC/CO) 45/50/5:18 g (45% by weight) of IPP (MFI: 0.3), 20 g (50% by weight) of PC and 2 g (5% by weight) of IPP graft copolymer from Example V3.

The flexural modulus of elasticity is shown in Table 1.

Example 10:

Preparation of an IPP/polystyrene blend (PS) with the use of the ELPP graft copolymer from Example 4 as a compatibilizer. A blend of 18 g (45% by weight) of IPP, 20 g (50% by weight) of PS (PSH 165, from BASF, viscosity number according to ISO 1628/1 (1984) 119 ml/g) and 2 g (5% by weight) of ELPP graft copolymer from Example 4 was prepared analogously to Example 7.

The flexural modulus of elasticity is shown in Table 1.

Comparative Example V10:

Under conditions analogous to those mentioned in Example 10, an IPP/polystyrene blend was prepared with the use of the IPP graft copolymer from Comparative Example V4 as a compatibilizer. Blend composition (IPP/PS/CO) 45/50/5: 18 g (45% by weight) of IPP (MFI: 0.3), 20 g (50% by weight) of PS and 2 g (5% by weight) of IPP graft copolymer from Example V4.

The flexural modulus of elasticity is shown in Table 1.

From the measured values listed in Table 1, it is evident that the blends have much lower rigidity (lower modulus of elasticity) and exhibit far better toughness properties (falling dart test and double-V notched impact strength) when compatibilizers according to the invention are used than when known compatibilizers are used.

TABLE 1

| | | | \multicolumn{2}{c}{Properties of the blends} | | | | |
|---|---|---|---|---|---|---|---|---|
| Example | Blend | CO from Example | E-modulus (MPa) | | FD (J) | | DV (kJ/m²) | |
| | | | l | t | Wmax | Wtot | l | t |
| 5 | PP/PA | 1 | 985 | 1010 | 6 | 9 | 44.6 | 9 |
| V5 | PP/PA | V1 | 1405 | 1289 | 5.3 | 7.8 | 22.7 | 2.4 |
| 6 | PP/PA | 1 | 1134 | 1082 | 22 | 23 | 48.1 | 5.2 |
| V6 | PP/PA | V1 | 1298 | 1276 | 2.2 | 3.6 | 32.8 | 4.7 |
| 7 | PP/PA | 2 | 1552 | | | | | |
| V7 | PP/PA | V2 | 2061 | | | | | |
| 8 | PP/PET | 3 | 1795 | | | | | |
| V8 | PP/PET | V3 | 2277 | | | | | |
| 9 | PP/PC | 3 | 1442 | | | | | |
| V9 | PP/PC | V3 | 1580 | | | | | |
| 10 | PP/PS | 4 | 1683 | | | | | |
| V10 | PP/PS | V4 | 1953 | | | | | |

E-modulus    Flexural modulus of elasticity according to DIN 53 457 (1987)
FD    Falling dart test according to DIN 53 443 (1984) Part 2 (23° C.)
Wmax    Energy at maximum force
Wtot    Total energy
DV    Double-V notched impact strength according to DIN 53 753 (1981)
(l)    Test along the processing direction
(t)    Test transverse to the processing direction
PP    Polypropylene
PA    Polyamide
PET    Polyethylene terephthalate
PC    Polycarbonate
PS    Polystyrene
CO    Compatibilizer

What we claim is:

1. A method of imparting increased compatibility to blends of polyolefins and nonolefinic thermoplastics, by adding to such blends, elastomeric polypropylenes (ELPPs) modified with ethylenically unsaturated graft monomers and/or blends thereof with isotactic polypropylenes (IPPs) modified with ethylenically unsaturated graft monomers.

2. A method of imparting increased adhesion to composites or laminates of polyolefins and metals, by adding to such composites or polyolefins, elastomeric polypropylenes (ELPPs) modified with ethylenically unsaturated graft monomers and/or blends thereof with isotactic polypropylene (IPPs) modified with ethylenically unsaturated graft monomers.

3. A blend of polyolefins and nonolefinic thermoplastics, containing, as a compatibilizer, elastomeric polypropylenes (ELPPs) modified with ethylenically unsaturated graft monomers and/or blends thereof with isotactic polypropylenes (IPPs) modified with ethylenically unsaturated graft monomers.

* * * * *